United States Patent [19]
Grenier et al.

[11] 3,777,142
[45] Dec. 4, 1973

[54] HIGH RESOLUTION RADIOACTIVITY DISTRIBUTION DETECTION SYSTEM

[75] Inventors: Raymond P. Grenier, Wilmington, Mass.; Earl B. Jacobson, Hoffman Estates, Ill.

[73] Assignee: Baird-Atomic Inc., Bedford, Mass.

[22] Filed: July 8, 1971

[21] Appl. No.: 160,697

[52] U.S. Cl. .............................. 250/327, 250/491
[51] Int. Cl. ............................................. G01t 1/20
[58] Field of Search ..................... 250/71.5 R, 71.5 S

[56] References Cited
UNITED STATES PATENTS

| | | | |
|---|---|---|---|
| 3,594,577 | 7/1971 | Loveday.......................... | 250/71.5 R |
| 3,634,688 | 1/1972 | DiRocco ........................ | 250/71.5 R |
| 3,465,145 | 9/1969 | Leiter............................. | 250/71.5 S |
| 3,116,416 | 12/1963 | Reed.............................. | 250/71.5 S X |
| 3,221,731 | 12/1965 | Annis et al. ................... | 250/71.5 S X |
| 3,509,341 | 4/1970 | Hindel et al..................... | 250/71.5 S |

Primary Examiner—Archie R. Borchelt
Attorney—Gerald Altman et al.

[57] ABSTRACT

Radiation emitted from a subject positioned on a programmable X,Y platform is detected by means of an array of sensing devices. The platform, which is in spaced relationship with the subject, is moved along its X and Y axes in incremental steps defining a programmed scanning pattern, each step being an integral multiple of the distance between adjacent sensing devices. The radioactive events, which are detected at each step, are temporarily held in a memory and then stored on a recording medium. Upon completion of the programmed scanning sequence, the stored data which represents the radioactivity detected at each step is recalled from the recording medium and applied to a display via the memory for presentation as a combined pictorial representation of the detected radioactive events at each step.

13 Claims, 9 Drawing Figures

INVENTORS
RAYMOND P. GRENIER
EARL B. JACOBSON
BY
Morse, Altman & Oates
ATTORNEYS

HIGH RESOLUTION RADIOACTIVITY DISTRIBUTION DETECTION SYSTEM

BACKGROUND OF THE INVENTION

1. Field of Invention

The present invention relates to radiation detectors and more particularly to a radioactivity distribution detection system having a programmable X,Y platform.

2. Description of the Prior Art

Various types of radioactivity distribution detection systems have become known in the art for determining the location of radioactive material injected in diagnostic amounts into a human body or the like. These systems have not proven to be entirely satisfactory. For example, due to a low degree of resolution or definition in the displayed data, such systems have suffered from the disadvantage that a limited amount of information is presented with respect to low level radioactive events.

SUMMARY OF THE INVENTION

It is an object of the present invention to provide a radioactivity distribution detection system characterized by a high resolution display of the relative concentrations of a radioactive isotope within a section of a structure containing an unknown distribution of activity. Radiation emitted from a subject positioned on a programmable X,Y platform is detected by means of an array of sensing devices. The X,Y platform, which is spaced relationship with the subject, is moved along its X and Y axes in incremental steps defining a preprogrammed scanning pattern, each step being an integral multiple of the distance between adjacent sensing devices. The radioactive events detected at each step are temporarily held in a memory and then stored on a recording medium. Upon completion of the programmed scanning sequence, the stored data is recalled from the recording medium and applied to a display via the memory for presentation as a combined pictorial representation of the detected radioactive events at each step. The high degree of resolution in the presented data results from the programmed scanning of the X,Y platform with respect to the array which reduces the raster width of the display.

The invention accordingly comprises the system possessing the construction, combination of elements, and arrangement of parts that are exemplified in the following detailed disclosure, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE INVENTION

Generally, the invention may be characterized as a radioactivity distribution detector in combination with a programmable X,Y platform which provides an imaging system for presenting a high resolution pictorial display of the relative concentrations of a radioactive isotope within a section of a structure containing an unknown distribution of activity. Specific applications of the invention would be the visualization of body structures, organs and defects in subjects undergoing a diagnosis following administration of a diagnostic amount of radioactive material. By complementing a radioactivity distribution detector of the type shown in U.S. Pat. No. 3,308,438, in the name of Philip Spergel, dated Mar. 7, 1967, and assigned to the assignee of this application, with a movable X,Y platform which is scanned in a programmed sequence, the invention provides a radioactivity distribution detecting system which is characterized by high detection probability, distinct uniformity in reproduction characteristics, and high resolution in the presented data.

Figure 1:
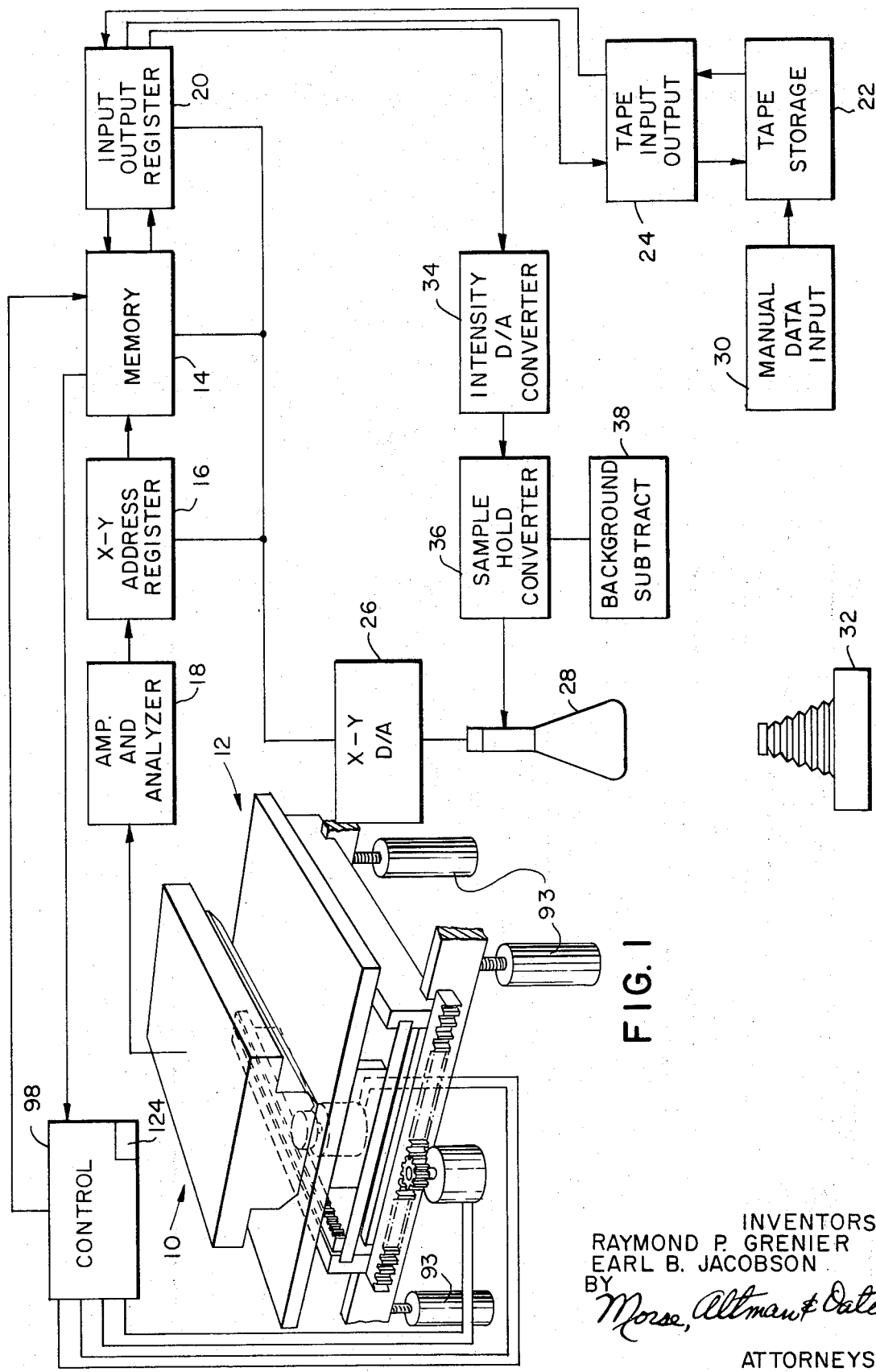
FIG. 1 is a schematic drawing showing the system in generally block form.

Referring now to FIG. 1, the radioactivity distribution detection system generally comprises a collimated detector assembly 10 which is sensitive to radiation from a subject reclining on a programmable X,Y platform 12 positioned in spaced relationship with assembly 10. Individual scintillation events in detector 10 are sensed and the coordinate position of each is digitized and fed into a memory 14 by means of an X,Y coordinate address register 16. As hereinafter described, programmable X,Y platform 12 is moved in a specified scanning sequence, each scintillation event being sensed when X,Y platform 12 is stationary. An amplifier and pulse height analyzing unit 18 is interposed between detector 10 and register 16 to amplify the output of the detector and to provide discrimination against noise and events of energy other than that being used.

Memory 14 stores all acceptable data sensed by detector 10 and passed through amplifier analyzing unit 18. Each event sensed at a particular location of the subject, as defined by the X,Y position of the platform with respect to detector 10, is addressed into the storage and accumulated to previous events having the same address. Thus, the number stored at a given address represents the number of recorded disintegrations having originated within the monitored subject at a point, the location of which corresponds to the address. An input/output register 20 feeds information stored in memory 14 into a recorder 22 via an input/output unit 24 during the data accumulation period. A manual data input 30 may also be employed for logging any pertinent data in recorder 22, for example a magnetic tape. Following the accumulation period, the data stored on magnetic tape 22 is applied to a digital to analog converter 26 via memory 14. Converter 26 generates analog signals to a display 28 for presentation of a combined pictorial display of the detected events. The presented data may be photographed by a camera 32 to provide a permanent pictorial record. Preferably, a Polaroid type camera 32 is employed and the photographic record will constitute a pictorial two-dimensional display of the relative distribution or radioactive material within the volume being examined, a section of higher activity being represented as an area of greater density and a relatively inactive section as an area of lesser density. A movie type or television camera can also be used to record rapid changes in the display. A digital to analog converter 34 operates on the output of the memory 14 and input/output register 20 and supplies the stored data to a sample, hold and correlate subsystem 36. Subsystem 36 performs cross-correlation on the stored data and supplies analog signals to display 28, for example a storage type cathode ray tube. A background subtract system 38 is available to provide for controllable degrees of contrast enhancement and data reduction in order to facilitate clinical interpretation and evaluation of the recorded data.

Figure 2:
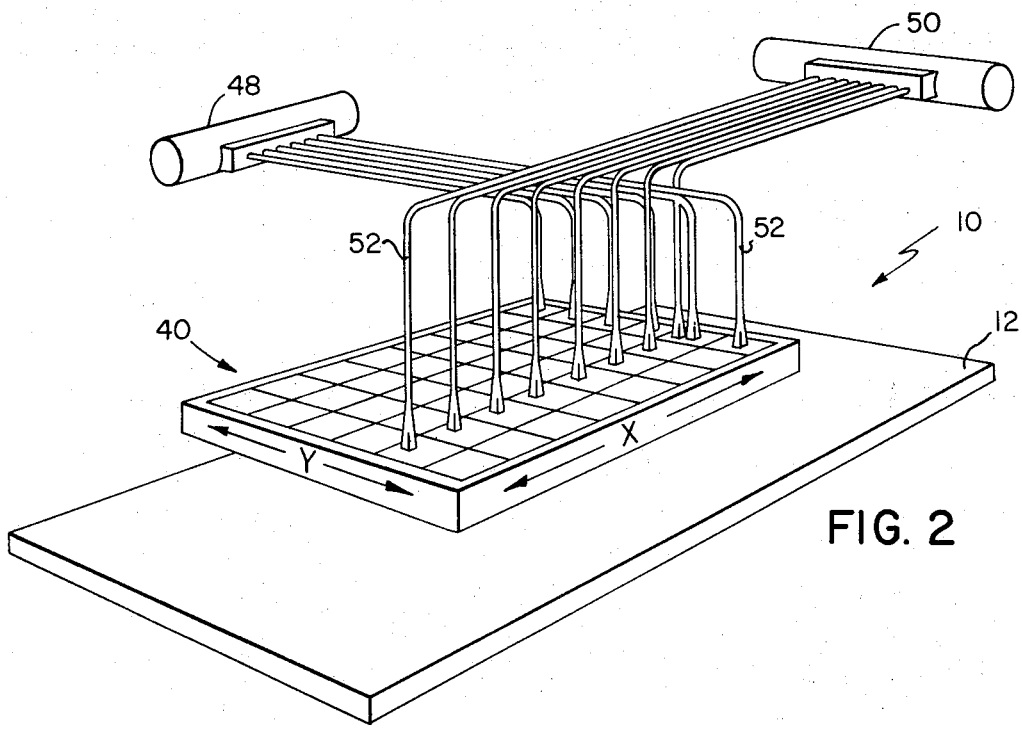
FIG. 2 is a perspective showing a portion of the electro-optical part of the detecting system.
Figure 4:
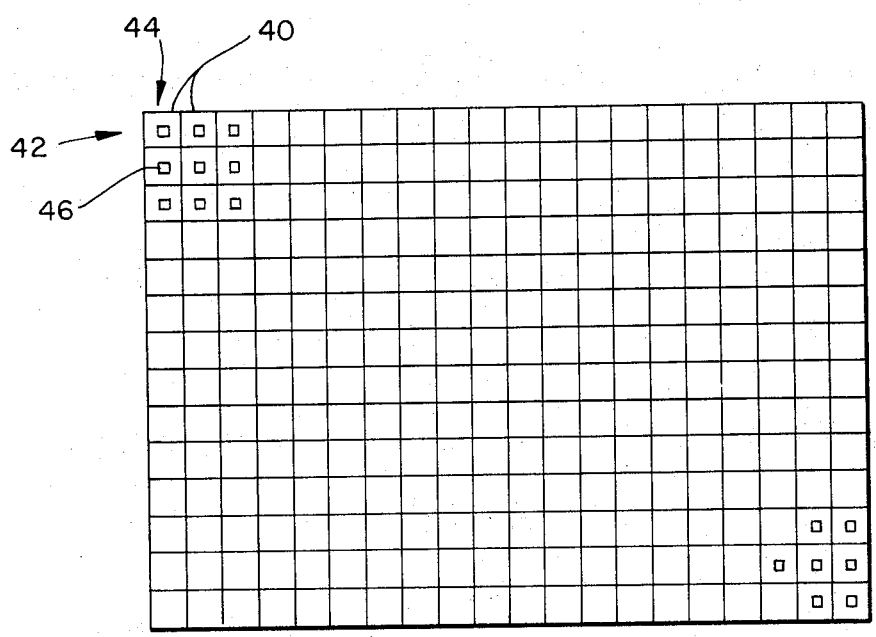
FIG. 4 is a plan view of the sensor grid array of FIG. 2.

Referring now to FIGS. 2 and 4 of the drawings, detector 10 will be described in detail. Detector 10 is an electrooptical system comprising an array of individual radioactive sensitive elements 40, typically distributed in columns 42 of 21 elements and in rows 44 of 14 elements. It is to be understood that the occurrence of a scintillation event in any one element is sensed and its coordinate position digitally encoded and fed into memory 14. The number of events that occur in each element for each step of the programmed scanning sequence are counted and stored in a corresponding location in memory 14, for example a 294 word coincident current core memory. Upon completion of each scanning step, the events stored in memory 14 for that X,Y location of the subject with respect to detector 10 are applied to magnetic tape 22 and the memory is cleared. That is, as platform 12 is moved to the next scanning step, the events stored in memory 14 are recorded on tape 22, memory 14 is cleared and readied for reception of data from the succeeding scanning step.

Each detecting element 40 typically is a scintillator composed of a thallium-activated sodium iodide crystal or a cesium crystal having the form of a thin disc, for example. Each scintillator 40 is formed with a collimator bore 46 in the shape of a square, for example, each bore tapering off to a smaller diameter in the direction of the subject. Optically coupled to the array of scintillator crystals are photomultiplying devices 48 and 50 with a separate photo detector for each column 42 and a separate photo detector for each row 44 of detecting elements 40. As shown, each photodetecting device is optically coupled to its associated detecting elements by means of light pipes 52, typically composed of a material which transmits the wavelengths emitted from the scintillator, for example, an acrylic resin such as methyl methacrylate, a clear epoxy, glass, etc. As best shown in FIG. 2, each photomultiplying device connects to a number of light pipes 52, with each pipe being connected to a single detection element in a row or column. It will thus be understood that any event sensed by a detecting element 40 will produce an output signal and this signal will be multiplied by the photomultiplying devices 48 and 50. It will be appreciated that, by reason of their optical coupling, these photomultiplying devices will also provide information as to the coordinate position of the event. Any detecting device within the array will cause a response in only one unique pair of photo detectors with the result that the arrangement of detecting elements, light pipes and photo detectors provides a technique for obtaining digital information from the crystal array. Therefore, the unique pair of photo detectors provides the X and Y coordinate signal data.

The optical system may also be organized to obtain the digital coordinate information in a binary coded format. Each detecting element 40 has connected to it adequate numbers of light pipes 52 to provide a coded signal. The system is one of piping light from the crystal array for each scanning step of programmable platform 12 in order to obtain binary combinations representing the position of the event detecting during that scanning step.

Figure 3:
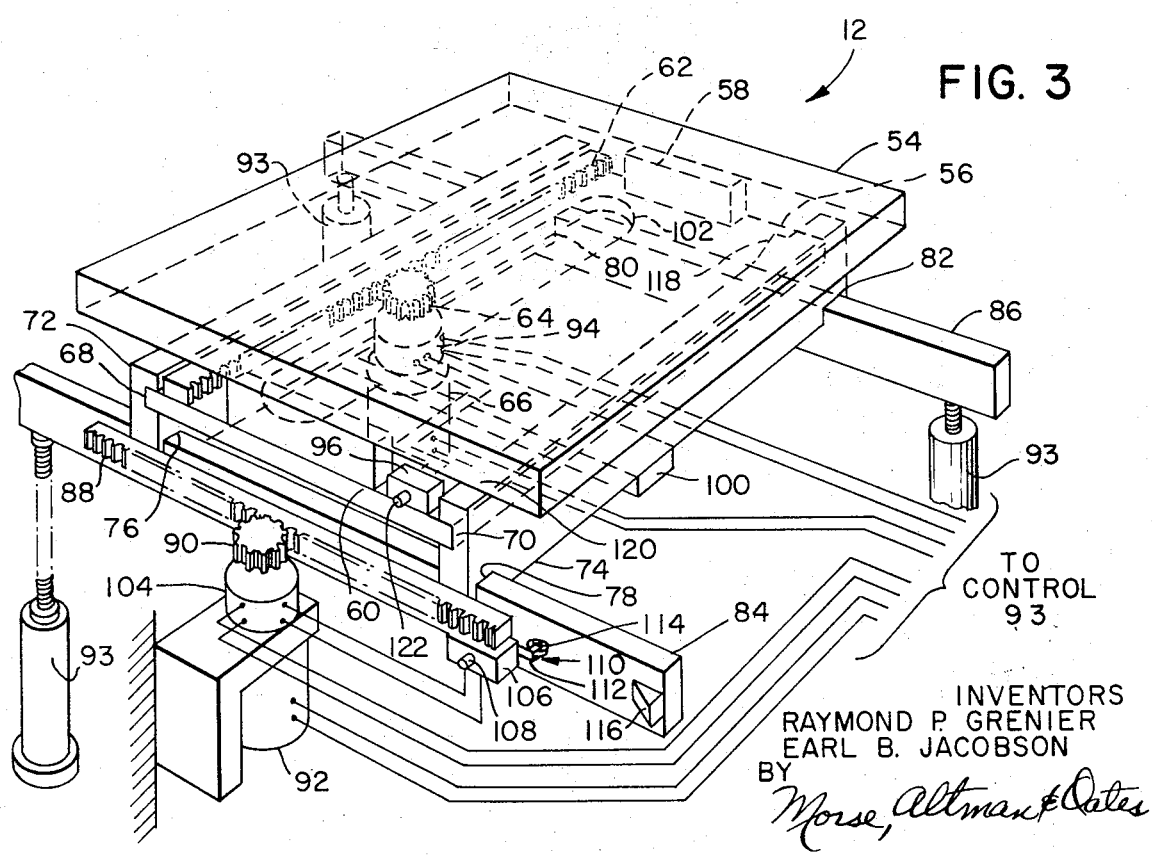
FIG. 3 is a phantom perspective showing the programmable platform portion of the system.

Referring now to FIG. 3 of the drawings, programmable X,Y platform 12 will be described in detail. Platform 12 comprises a table 54 which is mounted to a slidable member 56 by means of supports 58, 60. Also mounted to member 56 is a rack 62 which engages a pinion 64 of a drive 66. Member 56 is slidably received in guideways 68, 70 which are provided in parallel guides 72, 74, respectively, rack 62 being in parallel spaced relationship with guides 72, 74. Guideway 68 extends along the longitudinal axis of guide 72 and guideway 70 extends along the longitudinal axis of guide 74. Guides 72 and 74 are formed also with a pair of transverse guideways 76, 78 and 80, 82, respectively, guideway 76 being in registration with guideway 80 and guideway 78 being in registration with guideway 82. Fixed guides 84 and 86 are slidably received in guideways 76, 80 and 78, 82, respectively, fixed guides 84, 86 being in parallel spaced relationship with one another and in perpendicular spaced relationship with guides 72, 74. Mounted to guides 72, 74, in parallel spaced relationship with guides 84, 86, is a rack 88 which engages a pinion 90 of a drive 92. It will be realized from the foregoing description that table 54, member 56, and rack 62 are slidable in a first direction within guideways 68, 70; and guides 72, 74 and rack 88 are slidable in a second direction within guideways 76, 80; the first and second directions being mutually perpendicular to one another. For convenience, by way of example, the first and second directions will be referred to as the X and Y directions, respectively. That is, drive 66 operates to move table 54 in the X direction and drive 90 operates to move table 54 in the Y direction. It is to be understood that platform 12 is movable also in the Z axis by means of a jack screw 93, for example.

As illustrated in FIG. 3, pinion 64 is coupled to drive 66, for example a stepping motor, by means of a clutch 94 which is further connected to a switch 96 and a control 98. Drive 66 is mounted to a cross bar 100 which is fastened to guides 72, 74. Member 56 is formed with an elongated slot 102 which defines a clearance for drive 66 as member 56 travels in the X direction. Pinion 90 is coupled to drive 92, for example a stepping motor, by means of a clutch 104 which is futther connected to a switch 106 and control 98. Switch 106 is provided with a contactor 108 which operates to disengage clutch 104 and allows manual positioning of platform 12 in the Y direction. Switch 106 is also provided with a limit device 110 in the form of a finger 112 and a roller 114. Limit device 110 operates to disengage clutch 104 when roller 114 engages a wedge shaped stop 116 on guide 84. That is, as shown in FIG. 3, limit device 110 prevents further travel of table 54 toward the right hand limit of guide 84. Although only one stop has been shown, it is to be understood that guide 84 is provided with a second stop which prevents further travel of table 54 toward the left hand limit of guide 84.

In a similar arrangement, guide 74 is provided with a stop 118 and switch 96 is provided with a limit device 120 for preventing travel of table 54 in the X directions beyond preset limits. Switch 96 is provided also with a contactor 122 which operates to disengage clutch 104 and allows manual positioning of platform 12 in the X direction.

Figure 5:
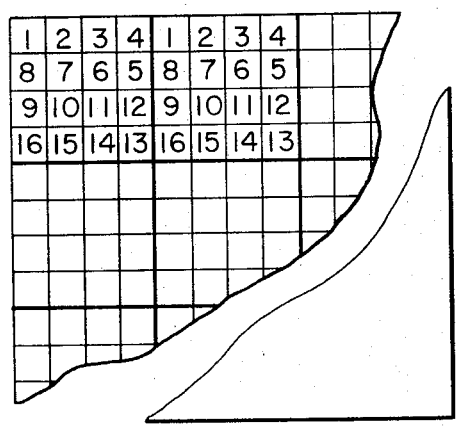
FIGS. 5-7 are graphical representations illustrating alternative programmed scanning sequences of the platform.
Figure 6:
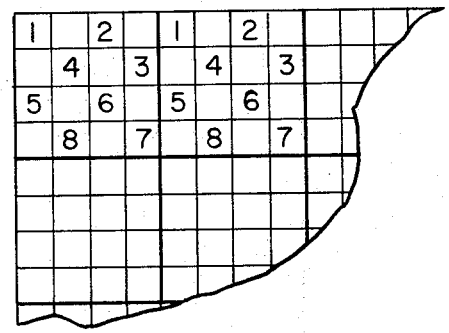
Figure 7:
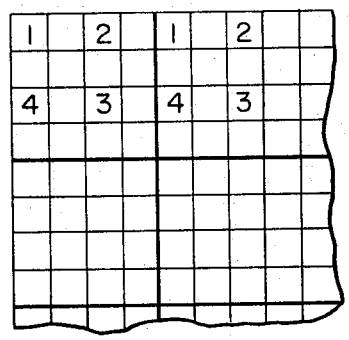

As previously indicated, control 98 is connected to clutches 94 and 104. In addition, control 98 is electrically connected to stepping motors 66, 92 and memory 14. Control 98 is programmed to move platform 12 in a scanning sequence of 16, 8, or 4 incremental steps. The scanning sequences for the various scanning patterns of 16, 8, and 4 incremental steps are shown in FIGS. 5, 6, and 7, respectively, the numeral 1 being the first step, the numeral 2 being the second step, and so on. Since array 10 comprises 294 elements arranged in columns of 21 and in rows of 14, each incremental step measures 294 independent spatial segments which corresponds to the 294 spatial segments of multi-hole collimator array 10. Each hole 46 is used to limit the field of view of each detector 40 to a unique spatial segment in the object being measured. In this manner, an image of the organ under diagnosis is obtained which is made up of 294 picture elements corresponding to the 294 unique spatial segments isolated by the multi-hole collimator. The shape and volume of each separate spatial segment in the object is defined solely by the geometry of each collimator hole 46. Since all the collimator holes are identical, each spatial segment in the object has the same shape and volume. The multi-hole collimator breaks up the organ into 294 equal spatial segments which are then presented as 294 picture elements. The shape and volume of the spatial segment isolated by the collimator hole determine the spatial resolution of the imaging system, the spatial resolution obtainable being dependent upon the number of spatial segments. That is, the information content of the final image has a one-to-one correspondence to the number of independent spatial segments that can be isolated in the object of the collimator holes. Different collimator configurations result in spatial segments which differ in shape and volume. For example, straight-bore collimators isolate spatial segments in the object with a simple conical shape. The superposition of conically shaped spatial segments provide the familiar hour-glass shape of the spatial segment isolated by focussed collimators.

The shape and volume of the spatial segment isolated by a collimator hole can be altered due to septal penetration, Compton scattering, and finite intrinsic spatial resolution of the detector. The final image with maximum information content will be achieved when the volume of interest is viewed with the highest number of independent spatial segments, and when each independent spatial segment is recorded with a statistically significant number of detected events.

The number of independent spatial segments observable is increased to the theoretical limit of collimator resolution by moving the subject to a number of N different positions. Since each position measures 294 independent spatial segments which generate the corresponding 294 picture elements, the final image consists of N times 294 picture elements. The information content of each picture element is determined uniquely by the collimator with no deterioration of information due to finite intrinsic spatial resolution at the detector. This information integrity is maintained, because the array of individual crystals yields unique X,Y positioning for every event detected. Septal penetration is minimized or eliminated by using thicker collimators which maintain sufficiently thick septa. The number of independent spatial segments cannot be increased by simply increasing the number of holes in the collimator, except at low energy, because septal penetration destroys the information content of each picture element, that is, the spatial segments blow up in size.

Figure 8:
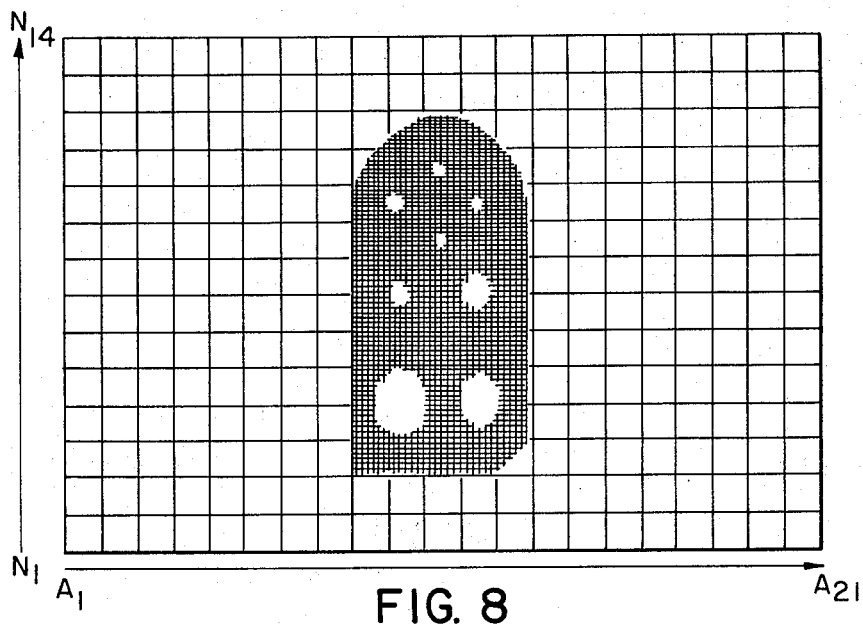
FIG. 8 is a plan view of the display face for presenting one form of data.

As previously indicated, control 98 is programmed to move platform 12 in a scanning sequence of 16, 8, or 4 incremental steps. It is to be understood that, in alternate embodiments, the scanning sequence is other than 16, 8, or 4 incremental steps, for example, 32, 2, or 1. Data is accumulated for a preset time at each step, control 98 being provided with a timer 124 which permits accumulation periods from 1 to 1000 seconds in one-second steps. The data accumulated for the first incremental scanning step is addressed into memory 14 in the manner hereinbefore described. At the end of the first accumulation period, the data in memory 14 is stored on magnetic tape 22 and the memory is cleared. Platform 12 is then moved to the second incremental scanning step, a new frame of data is accumulated and is stored on magnetic tape 22. When the last incremental scanning step has been stored, a combined image is presented on display 28 as shown in FIG. 8. The stored data being applied to the display from tape 22 via input/output 24, input/output registry 20, memory 14, and digital to analog converter 26. Preferably, display 28 is a storage cathode-ray tube oscilloscope with intensity modulation which allows the entire scanning measurement to be displayed as one picture. Also, it is preferred that oscilloscope 28 is provided with a pair of displaying screens which allows two separate views to be displayed at one time. For example, a right lateral brain and a left lateral brain on the same display, or the right and left being obtained by positioning the multi-hole collimator first over one lung, then over the other lung.

Figure 9:
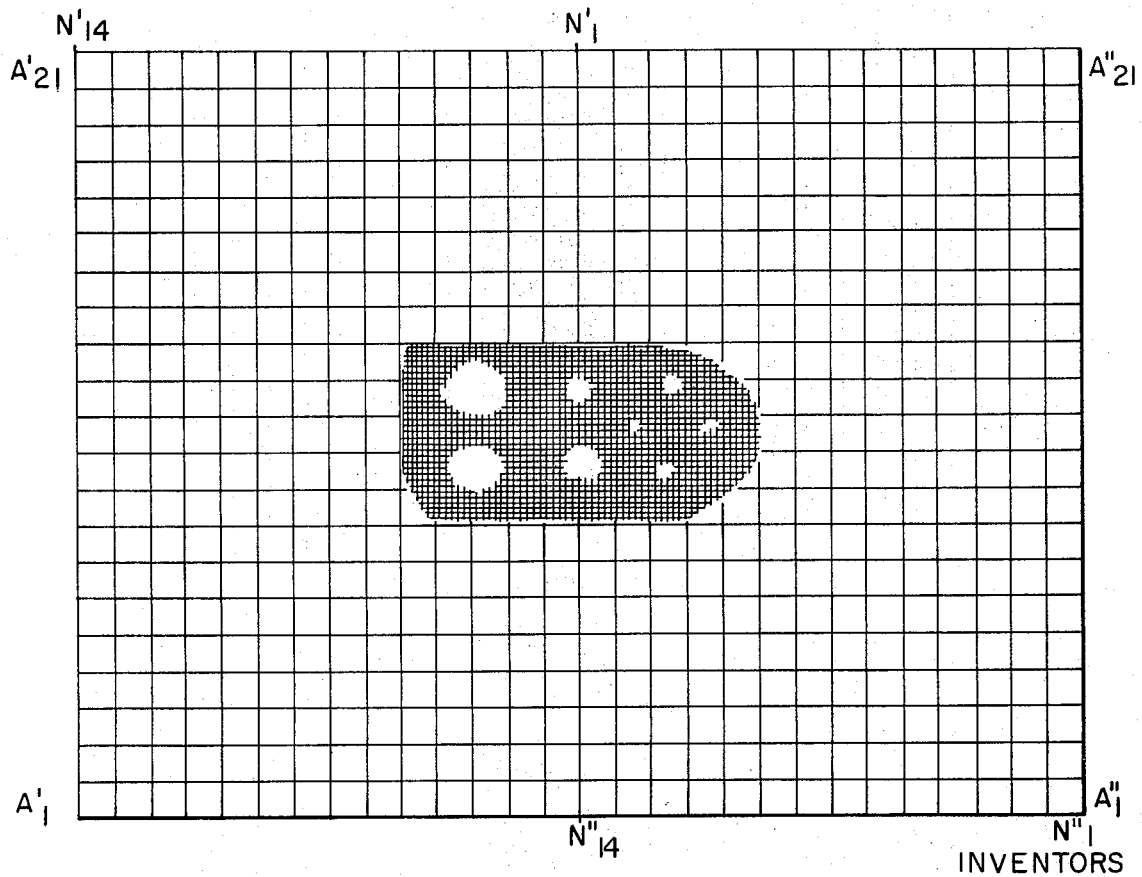
FIG. 9 is a plan view of the display face for presenting an alternate form of data.

In addition, when the area under diagnosis is greater than the displaying face illustrated in FIG. 8, two sets of scanning measurements are taken and presented as a combined image. FIG. 9 illustrates the presented image when two sets of scanning measurements are taken. It will be noted that in FIG. 9, the display face of FIG. 8 has been rotated 90°.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A radiation monitoring system for detecting radioactivity in a subject, said system comprising:
   a. radiation sensing means defining an array of sensing zones, each said radiation sensing means defining a unique spatial segment in the subject;
   b. a plurality of photo detecting devices optically coupled to said array, a unique combination of said photo detecting devices defining a selected sensing zone;
   c. memory means operatively connected to said photo detecting devices for storing sensed data;
   d. means operatively connected to said memory means for recording said sensed data;

e. movable platform means on which the subject is positioned in spaced relationship with said array;

f. means for moving said platform means in incremental steps defining a scanning pattern, radioactivity events for each unique spatial segment in the subject being detected at each incremental step; and g. means operatively connected to said recording means for presenting said recorded data as a combined pictorial display.

2. The radiation monitoring system as claimed in claim 1 wherein said movable platform means is an X,Y table.

3. The radiation monitoring system as claimed in claim 2 wherein said means for moving includes a pair of stepping motors, one of said stepping motors operating to move said X,Y table in a first direction and the other of said stepping motor operating to move said X,Y table in a second direction, said first and second direction being perpendicular to each other.

4. The radiation monitoring system as claimed in claim 3 wherein said means for moving includes:

a. a pair of clutch means, one of said clutch means operatively connected to one of said stepping motors and the other of said clutch means operatively connected to the other of said stepping motors; and b. means operatively connected to each said clutch means for disengaging each said clutch means, said X,Y table being manually movable in said first direction when the correlative clutch means is disengaged and manually movable in said second direction when the correlative clutch means is disengaged.

5. The radiation monitoring system as claimed in claim 1 wherein said sensing means is a plurality of scintillators arranged in intersecting columns and rows.

6. The radiation monitoring system as claimed in claim 5 wherein each said scintillator is formed with a collimator bore.

7. The radiation monitoring system as claimed in claim 1 wherein said memory means is in the form of a coincident current core memory.

8. A radiation monitoring system for detecting radioactivity in a subject, said system comprising:

a. a plurality of individual scintillators arranged in intersecting rows and columns defining an array;

b. a photo detecting device associated with each of said rows and columns for detecting radioactivity events;

c. light conducting means optically coupling each of said scintillators to a unique pair of said photo detecting devices;

d. memory means operatively connected to each said photo detecting device for storing detected events;

e. means operatively connected to said memory means for recording said stored data;

f. movable platform means in spaced relationship with said array, said subject positioned on said movable platform means;

g. means for moving said movable platform means in incremental steps defining a scanning pattern, radioactivity events being detected at each incremental step; and h. means operatively connected to said recording means for presenting said recorded data as a combined pictorial display.

9. The radiation monitoring system as claimed in claim 8 wherein said means for presenting is a cathode ray tube.

10. The radiation monitoring system as claimed in claim 8 wherein said means for moving includes a pair of stepping motors, one of said stepping motors operating to move said platform in a first direction and the other of said stepping motors operating to move said platform in a second direction, said first and second directions being mutually perpendicular to eachother.

11. The radiation monitoring system as claimed in claim 10 wherein said first direction is along an X axis and said second direction is along a Y axis.

12. The radiation monitoring system as claimed in claim 11 including means operatively connected to said platform for moving said platform along a Z axis.

13. The radiation monitoring system as claimed in claim 10 wherein said means for moving includes:

a. a pair of clutch means, one of said clutch means operatively connected to one of said stepping motors and the other of said clutch means operatively connected to the other of said stepping motors; and b. means operatively connected to each said clutch means for disengaging each said clutch means, said platform manually movable in said first direction when the corresponding clutch means is disengaged and manually movable in said second direction the other clutch means is disengaged.

* * * * *